(12) United States Patent
Yamashita

(10) Patent No.: US 7,200,988 B2
(45) Date of Patent: Apr. 10, 2007

(54) AIR-FUEL RATIO CONTROL SYSTEM AND METHOD

(75) Inventor: Yukihiro Yamashita, Takahama (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/200,159

(22) Filed: Aug. 10, 2005

(65) Prior Publication Data

US 2006/0059894 A1    Mar. 23, 2006

(30) Foreign Application Priority Data

Sep. 17, 2004   (JP)   ............................. 2004-270867

(51) Int. Cl.
*F01N 3/00*   (2006.01)
(52) U.S. Cl. ............................ 60/285; 60/274; 60/276; 60/299
(58) Field of Classification Search .................. 60/274, 60/276, 285, 299
See application file for complete search history.

(56) References Cited

U.S. PATENT DOCUMENTS

| | | | |
|---|---|---|---|
| 5,740,676 A * | 4/1998 | Agustin et al. ............... | 60/276 |
| 6,253,541 B1 * | 7/2001 | Sullivan et al. ............... | 60/274 |
| 6,256,981 B1 * | 7/2001 | Sullivan et al. ............... | 60/285 |
| 6,256,983 B1 * | 7/2001 | Yasui ........................... | 60/285 |
| 6,530,214 B2 | 3/2003 | Ikemoto et al. | |
| 6,539,707 B2 * | 4/2003 | Ikemoto et al. ............... | 60/285 |
| 6,904,751 B2 * | 6/2005 | Makki et al. .................. | 60/285 |

* cited by examiner

*Primary Examiner*—Thomas Denion
*Assistant Examiner*—Diem Tran
(74) *Attorney, Agent, or Firm*—Nixon & Vanderhye P.C.

(57) ABSTRACT

An air-fuel ratio control system has an upstream catalyst, a downstream catalyst, a first sensor for detecting a first air-fuel ratio present upstream the upstream catalyst, a second sensor for detecting a second air-fuel ratio present between the catalysts and a third sensor for detecting a third air-fuel ratio present downstream the downstream catalyst. An ECU determines a target second air-fuel ratio based on the detected third air-fuel ratio, and a target first air-fuel ratio based on the target second air-fuel ratio and the detected second air-fuel ratio. The ECU feedback controls an air-fuel ratio of mixture based on the target first air-fuel ratio and the detected first air-fuel ratio. The target first air-fuel ratio is corrected based on the detected third air-fuel ratio so that a change in the target first air-fuel ratio becomes smaller in a predetermined range other than a normal range.

7 Claims, 6 Drawing Sheets

AIR-FUEL RATIO CONTROL SYSTEM AND METHOD

CROSS REFERENCE TO RELATED APPLICATION

This application is based on and incorporates herein by reference Japanese patent application No. 2004-270867 filed on Sep. 17, 2004.

Field of the Invention

The present invention relates to an air-fuel ratio control system and method for internal combustion engines in which two catalysts are provided in series in an exhaust passage.

BACKGROUND OF THE INVENTION

U.S. Pat. No. 6,539,707 (JP 2002-235584A) proposes an air-fuel ratio feedback control system. In this system, two catalysts, an upstream catalyst and a downstream catalyst, are provided in series in an exhaust passage of an internal combustion engine to purify exhaust emissions. A first exhaust sensor is provided upstream the upstream catalyst to detect a first air-fuel ratio there. A second exhaust sensor is provided intermediate the two catalysts to detect a second air-fuel ratio there. A third exhaust sensor is provided downstream the downstream catalyst to detect a third air-fuel ratio there. A target second air-fuel ratio to be attained in or downstream the upstream catalyst, which is indicated by an output of the second exhaust sensor, is determined based on the detected third air-fuel ratio actually attained in or downstream the downstream catalyst, which is indicated by an output of the third exhaust sensor. A target first air-fuel ratio, which is to be attained upstream the upstream catalyst, is determined based on both of the target second air-fuel ratio and the detected second air-fuel ratio. An air-fuel ratio of mixture is feedback controlled by controlling a fuel injection amount based on a difference between the target first air-fuel ratio and the detected first air-fuel ratio.

With recent tighter exhaust emission regulations, an oxygen storage amount (oxygen occluding amount) in the downstream catalyst is increased. It is therefore likely in the conventional air-fuel ratio control system that the amount of lean gas components such as NOx emitted into the atmosphere increases under the condition that the upstream catalyst is in the rich condition (little oxygen) and the downstream catalyst is in the lean condition (much oxygen). This occurs for the following reasons.

When the upstream catalyst is in the rich condition, rich components such as unburned HC and CO flow from the upstream catalyst. If the amount of occluded oxygen in the downstream catalyst is small, the lean condition will readily end because the rich components flow from the upstream catalyst to the downstream catalyst. If the amount of occluded oxygen in the downstream catalyst is large, on the other hand, the lean condition will not readily end even if the rich components flow from the upstream catalyst. As a result, as shown in FIG. 8, lean components such as NOx emitted into the atmosphere will increase when the oxygen occlusion in the downstream catalyst is large (solid line) than when it is small (dotted line.

In the conventional air-fuel control system, further, the target first air-fuel ratio is feedback controlled in the lean direction even when the downstream catalyst is still in the lean condition at the time of a change in the upstream catalyst from the lean condition to the rich condition. Therefore, a sufficient amount of rich components for ending the lean condition in the downstream catalyst cannot be supplied to the downstream catalyst. As a result, the downstream catalyst tends to remain in the lean condition for a longer period and discharge the lean components such as NOx into the atmosphere.

SUMMARY OF THE INVENTION

The present invention addresses this drawback and has an object to efficiently purify exhaust emissions by using two catalysts provided in series in an exhaust passage of an internal combustion engine.

According to the present invention, an air-fuel ratio control system has an upstream catalyst, a downstream catalyst, a first exhaust sensor provided to detect a first air-fuel ratio present upstream the upstream catalyst, a second exhaust sensor provided to detect a second air-fuel ratio present between the catalysts and a third exhaust sensor provided to detect a third air-fuel ratio present downstream the downstream catalyst. An ECU determines a target second air-fuel ratio to be attained between the catalysts based on the detected third air-fuel ratio, and a target first air-fuel ratio at an upstream of the upstream catalyst based on the target second air-fuel ratio and the detected second air-fuel ratio. The ECU feedback controls an air-fuel ratio of mixture, which is detected as the first air-fuel ratio, based on the target first air-fuel ratio and the detected first air-fuel ratio. The target first air-fuel ratio is corrected based on the detected third air-fuel ratio so that a change in the target first air-fuel ratio becomes smaller in a predetermined range than in other range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
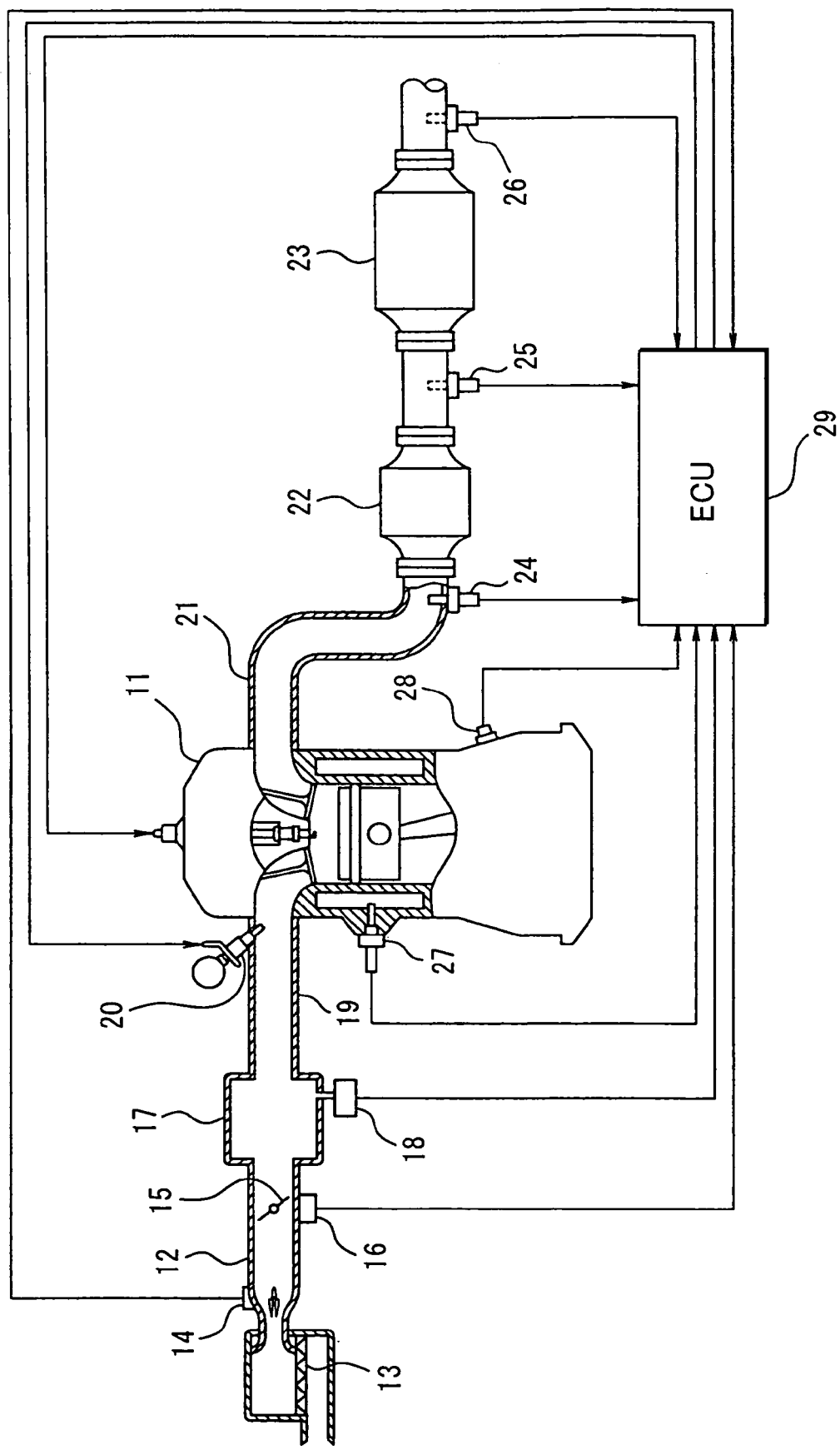
FIG. 1 is a schematic view showing an air-fuel ratio control system for an internal combustion engine according to an embodiment of the present invention.

Referring first to FIG. 1, an internal combustion engine 11 is connected to an air cleaner 13 through an intake passage 12. An air flow meter 14 is provided downstream the air cleaner 13 to detect an intake air amount in the intake passage 12. A throttle valve 16 and a throttle sensor 16 for detecting a throttle position are provided downstream the air flow meter 16.

A surge tank 17 is provided downstream the throttle valve 15. A pressure sensor 18 is attached to the surge tank 17 for detecting an intake air pressure in the surge tank 17. Intake manifolds 19 of the engine 11 are connected to the surge tank 17. A fuel injector 20 is attached to each manifold 19 for injecting fuel near the intake port of the engine 11. A coolant temperature sensor 27 and a crank angle sensor 28 are attached to the engine 11 for detecting an engine coolant temperature and an engine rotation speed, respectively.

In an exhaust passage 21 of the engine 11, an upstream catalyst 22 and a downstream catalyst 23 are provided in series. These catalysts 22 and 23 are three-way catalysts that purify exhaust gas components such as CO, HC and NOx discharged from the engine 11. A first exhaust sensor 24 is provided upstream the upstream catalyst 22 to detect an air-fuel ratio of mixture supplied to the engine 11 as a first air-fuel ratio of an exhaust gas of the engine 11. A second exhaust sensor 25 is provided between the upstream catalyst 22 and the downstream catalyst 23 to detect an air-fuel ratio of the exhaust gas flowing there as a second air-fuel ratio. A third exhaust sensor 26 is provided downstream the downstream catalyst 23 to detect a third air-fuel ratio of the exhaust gas flowing there as a third air-fuel ratio.

The first exhaust sensor 24 may be an air-fuel ratio sensor (linear A/F sensor) that produces an output linearly changing with an air-fuel ratio of the exhaust gas discharged as a result of air-fuel mixture combustion in the engine 11. The second and the third exhaust sensors 25 and 26 may be oxygen sensors that produce outputs changing in steps with the presence and absence of oxygen in the exhaust gas discharged from the upstream catalyst 22 and the downstream catalyst 23, respectively. The presence and absence of oxygen in the exhaust gas means a lean air-fuel ratio condition and the rich air-fuel ratio condition, respectively. The first exhaust sensor 24 may be replaced with an oxygen sensor, and the second and the third sensors 25 and 26 may be replaced with an air-fuel ratio sensor.

The outputs of those sensors are applied to an electronic control unit (ECU) 29. The ECU 29 is constructed with a microcomputer that executes an air-fuel ratio feedback control in the generally conventional manner. In this feedback control, the microcomputer executes a sub-feedback control routine shown in FIG. 2, which is different from the conventional routine. This sub-feedback control routine is for setting, based on the outputs of the second and the third exhaust sensors 25 and 26, an output (target first air-fuel ratio) to be attained by the first exhaust sensor 24. This target first air-fuel ratio is used in the feedback control, specifically in a main feedback in which a fuel injection amount is feedback controlled based on a difference between the target first air-fuel ratio and the detected first air-fuel ratio detected by the first exhaust sensor 24.

Figure 2:
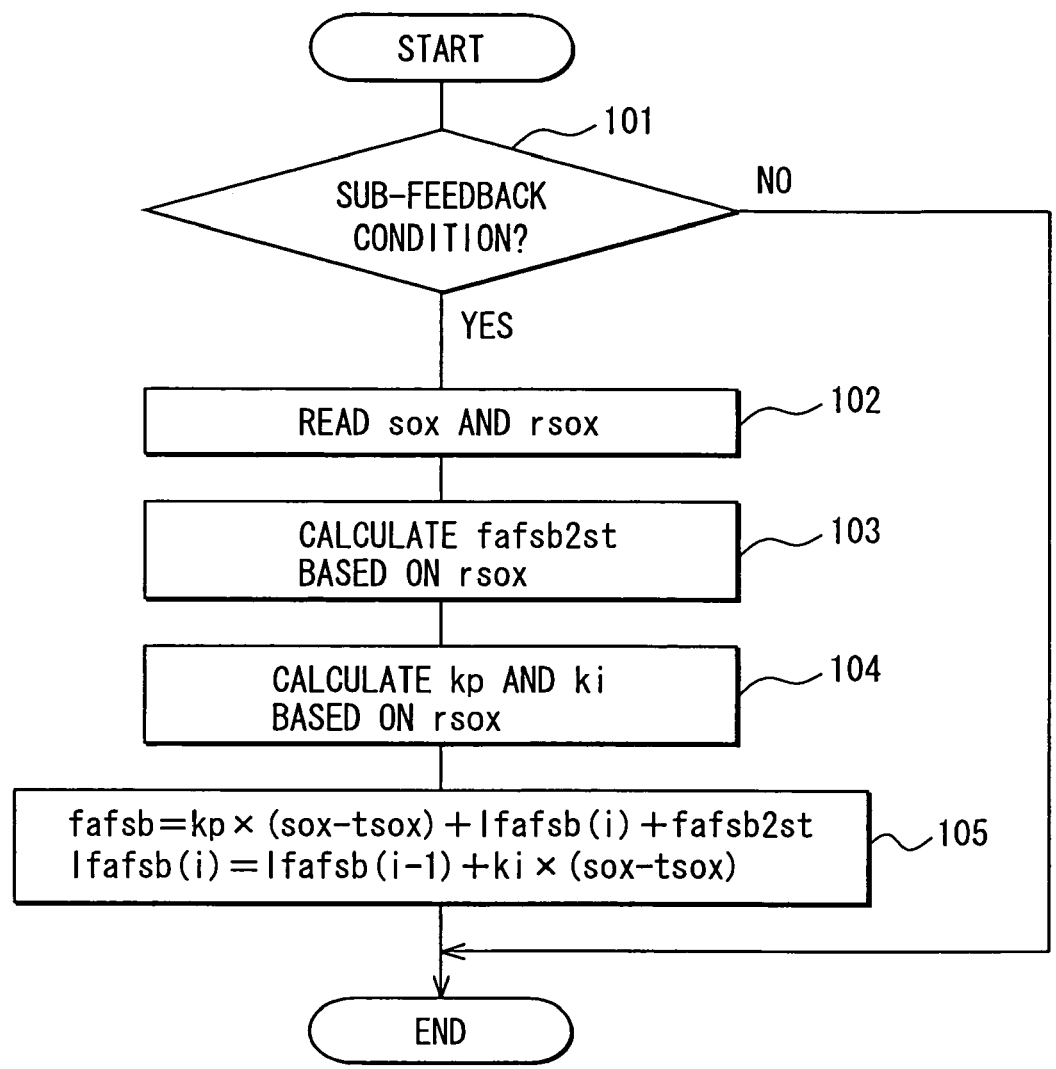
FIG. 2 is a flowchart showing a sub-feedback control routine executed in the embodiment.

The sub-feedback control routine of FIG. 2 is executed at a fixed interval (e.g., 25 ms) during an operation of the engine 11. In this routine, a target first air-fuel ratio fafsb to be attained by the exhaust gas upstream the upstream catalyst 22 is calculated by setting a target air-fuel ratio control gain (proportional gain kp or integral gain ki) to be smaller as a target air-fuel ratio correction value fafsb2st determined based on a third output (third air-fuel ratio) rsox of the third exhaust sensor 26 in a range that the target first air-fuel ratio fafsb is corrected based on the third output rsox of the third exhaust sensor 26.

In this routine, it is first determined at step 101 whether the engine 11 is in a sub-feedback control condition. This condition may be set to include that the engine coolant temperature is more than a predetermined temperature (catalysts 22 and 23 have already been warmed up) and the engine 11 is not in the high rotation speed or high load condition. If the engine 11 is not in the sub-feedback control condition, this routine ends.

If the engine 11 is in the sub-feedback control condition, the outputs sox and rsox of the second and the third exhaust sensor 25 and 26 are read in at step 102. Then at step 103, the target air-fuel ratio correction value fafsb2st is calculated or determined based on the output rsox of the third exhaust sensor 26 with reference to a pre-stored mapped data (FIG. 3) defining a relation of the target air-fuel ratio correction value fafsb2st relative to the output rsox of the third exhaust sensor 26.

Figure 3:
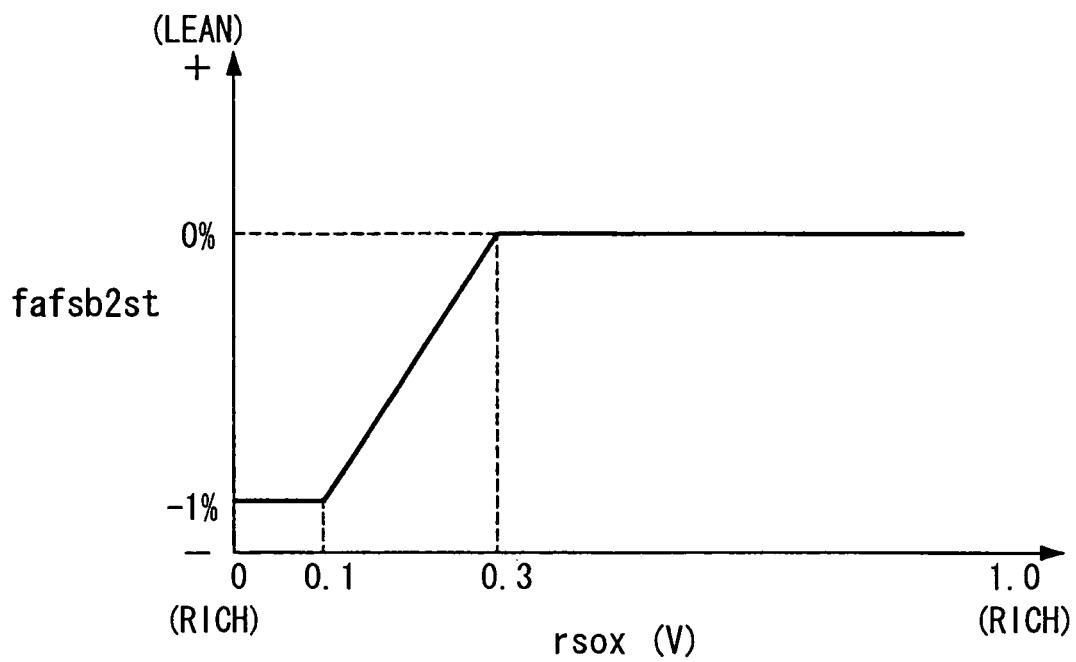
FIG. 3 is a characteristic diagram showing a mapped data relation between an output of a third exhaust sensor and a target air-fuel ratio correction value used in the embodiment.

According to this relation, as shown in FIG. 3, the target air-fuel ratio correction value fafst2st is set to 0% in the normal range where the output rsox of the third exhaust sensor 26 is more than a predetermined voltage (e.g., 0.3V), that is, the air-fuel ratio downstream the downstream catalyst 23 is richer than a region of the stoichiometric or a slightly lean ratio. That is, in this range, the target first air-fuel ratio fafsb is not corrected at all with the output rsox of the third exhaust sensor 26.

The target first air-fuel ratio fafsb is corrected to a richer ratio only in the range leaner than the stoichiometric ratio or the slightly lean ratio. In this region, the correction value fafsb2st increases in the negative direction with the output rsox of the third exhaust sensor 26 so that the target air-fuel ratio fafsb is made richer as the output rsox of the third exhaust sensor 26 decreases. The correction value fafsb2st is limited to a guard value (e.g., −1%) in the range where the output rsox of the third exhaust sensor 26 is less than a predetermined value (e.g., 0.1V).

Figure 4:
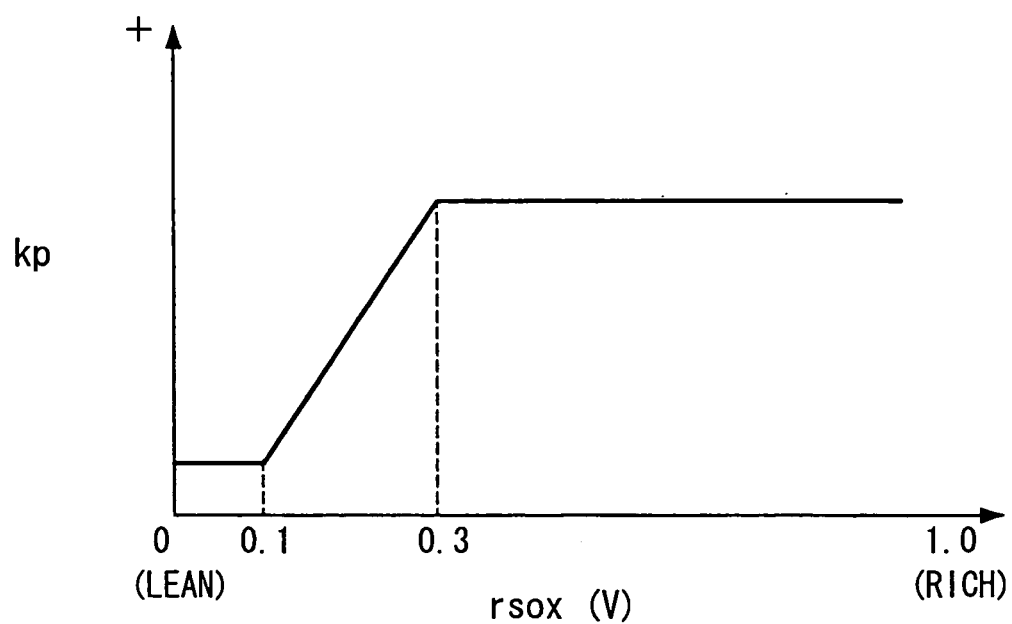
FIG. 4 is a characteristic diagram showing a mapped data relation between the output of the third exhaust sensor and a proportional gain used in the embodiment.
Figure 5:
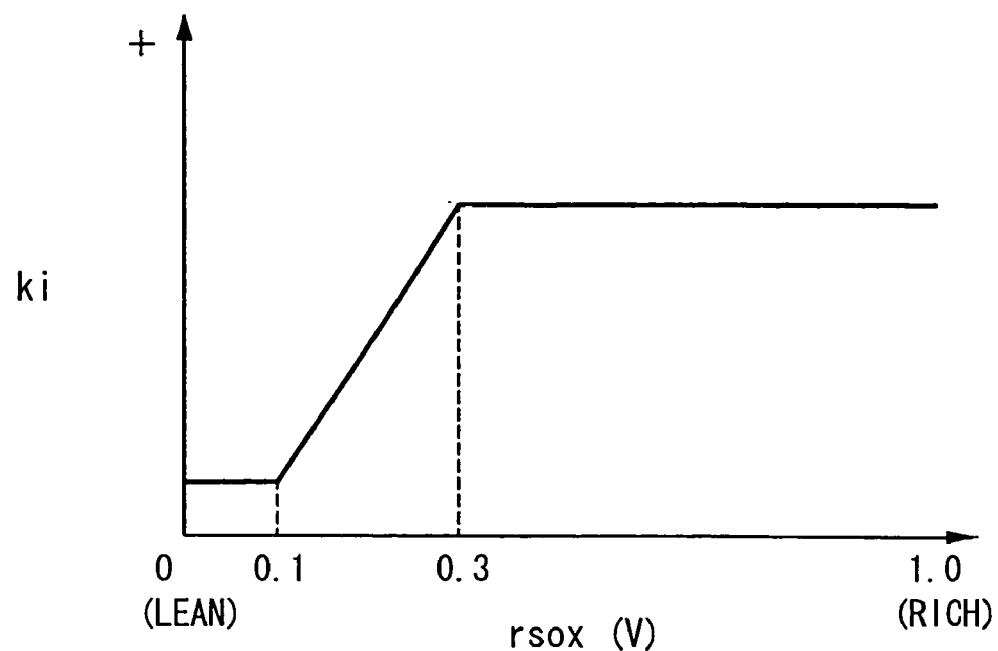
FIG. 5 is a characteristic diagram showing a mapped data relation between the output of the third exhaust sensor and an integral gain used in the embodiment.

After the determination of the target air-fuel ratio correction value fafsb2st, the target air-fuel ratio control gain (proportional gain kp and integral gain ki) is calculated or determined at step 104 based on the output rsox of the third exhaust sensor 26 with reference to a pre-stored mapped data (FIGS. 4 and 5). As shown in FIGS. 4 and 5, both the proportional gain kp and the integral gain ki are decreased as the output rsox of the third exhaust sensor 26 decreases between the predetermined values (0.3V and 0.1V). That is, the gains kp and ki are decreased in the range where the target air-fuel ratio fafsb is corrected based on the output rsox of the third exhaust sensor 26.

The target first air-fuel ratio fafsb is calculated as follows at step 105.

$$fafsb = kp \times (sox - tsox) + lfafsb(i) + fafsb2st$$

$$lfafsb(i) = lfafsb(i-1) + ki \times (sox - tsox)$$

In the above equation, $kp \times (sox - tsox)$ is a proportional term. $lfafsb(i)$ and $lfafsb(i-1)$ are present and previous values of an integral term, respectively. tsox is a target second output voltage to be attained by the second exhaust sensor 25 (target second air-fuel ratio to be attained between the upstream catalyst 22 and the downstream catalyst 23). This tsox is calculated or determined based on the output rsox of the third exhaust sensor 26 with reference to mapped data shown in FIG. 6.

Figure 6:
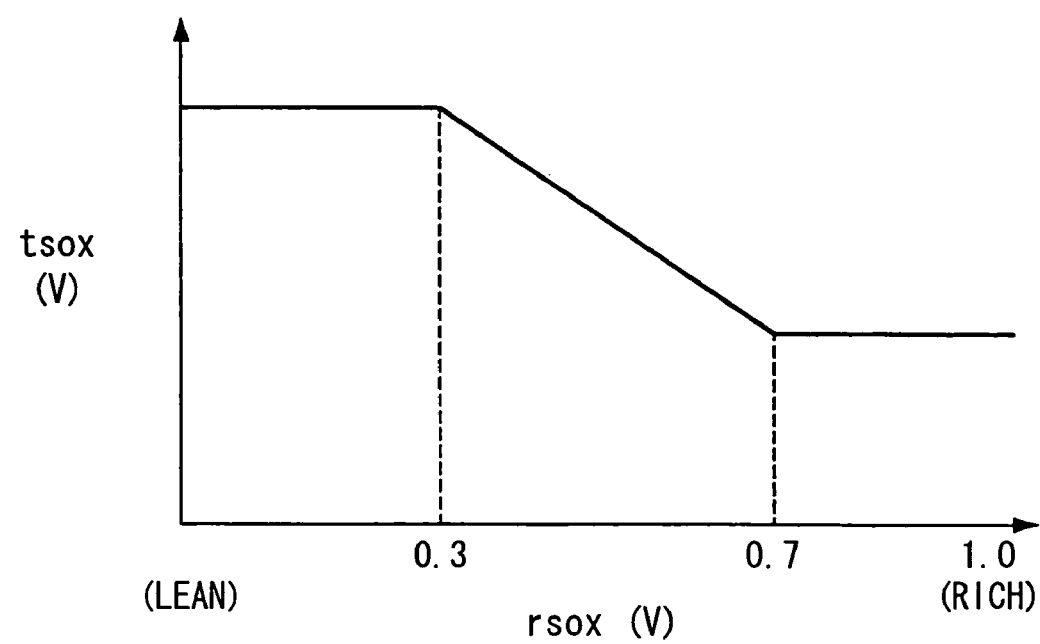
FIG. 6 is a characteristic diagram showing a mapped data relation between the output of the third exhaust sensor and a target output of the third exhaust sensor used in the embodiment.

As shown in FIG. 6, the target second output tsox is varied only within a range in which the output rsox of the third exhaust sensor 26 is between two predetermined values A and B. Specifically, the target output tsox is decreased as the output rsox of the third exhaust sensor 26 increases in a predetermined range (e.g., 0.3V–0.7V). The target output tsox is limited to a predetermined high guard value and a predetermined low guard value, when the output rsox of the third exhaust sensor 26 is lower than the output 0.3V and higher than the output 0.7V, respectively.

With the above target first air-fuel ratio fafsb calculated by the sub-feedback control routine, the main feedback control routine (not shown) feedback controls the fuel injection amount and hence the air-fuel ratio of air-fuel mixture so that the difference between the target first air-fuel ratio fafsb and the detected first air-fuel ratio detected by the first exhaust sensor 24.

Figure 7:
FIG. 7 is a time chart showing an operation of the embodiment.
Figure 8:
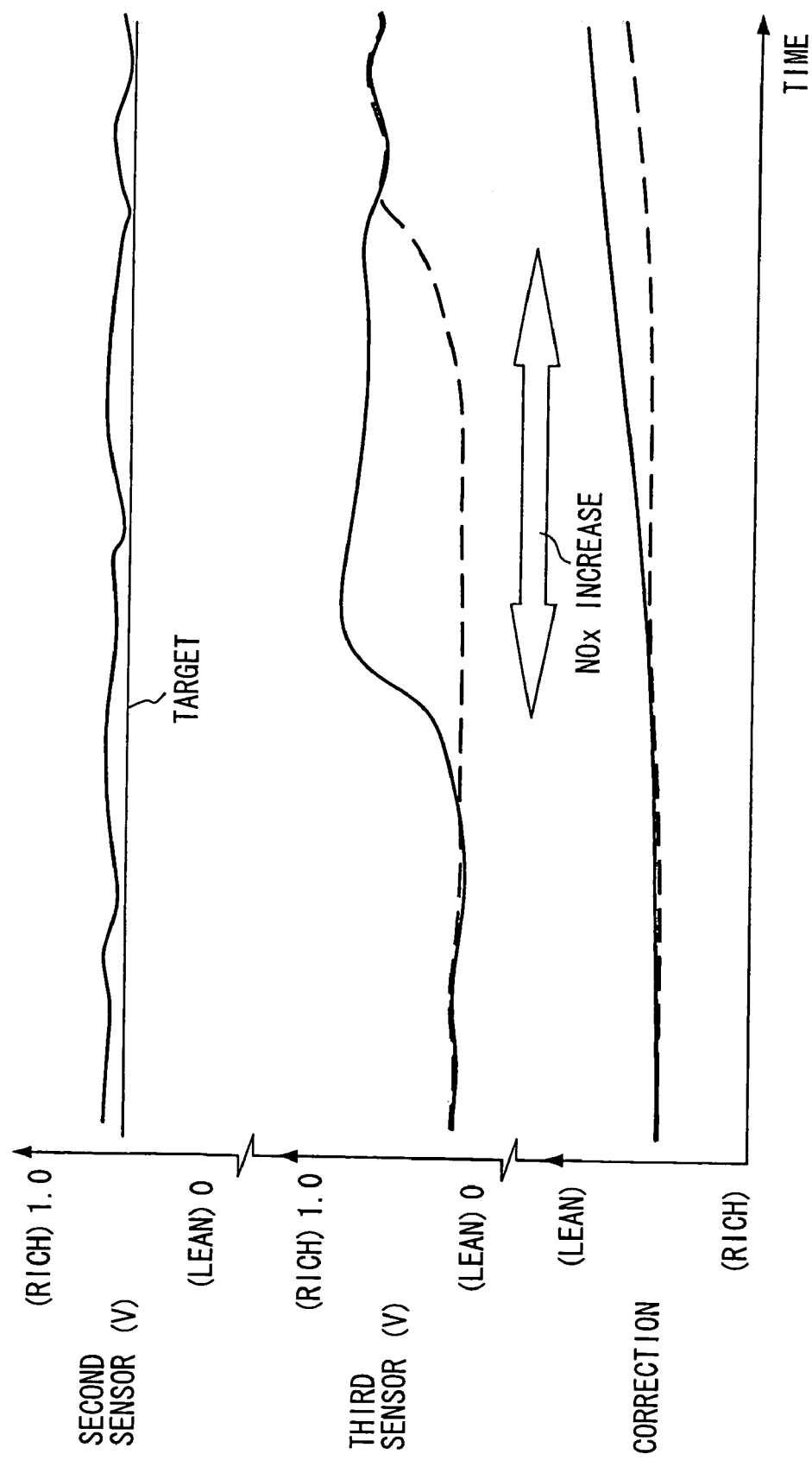
FIG. 8 is a time chart showing an operation of a conventional air-fuel ratio control system.

In this embodiment, as shown in FIG. 7, when the upstream catalyst 22 is in the rich condition (output of the second exhaust sensor 25 is high) and the downstream catalyst 23 is in the lean condition (output rsox of the third exhaust sensor 26 is low), the target first air-fuel ratio fafsb is corrected to a richer side. At this time, when the output rsox of the third exhaust sensor 26 is in the predetermined range (0.1V–0.3V) which is not the normal range, the change of the target first air-fuel ratio fafsb to the lean side in response to the rich output of the second exhaust sensor 25 is decreased. Thus, the target first air-fuel ratio is changed slowly. As a result, the upstream catalyst 22 maintains the rich condition longer. During this period, the upstream catalyst 22 supplies rich gas components to the downstream catalyst 23 to obviate the lean condition of the downstream catalyst 23 in a shorter period. Thus, the catalysts 22 and 23 connected in series can be operated efficiently to purify the exhaust emissions with higher purification rate.

Further, the target air-fuel ratio control gain (proportional gain kp or integral gain ki) is decreased as the correction value fafsb2st for correcting the target first air-fuel ratio fafsb to the rich side becomes larger. Therefore, even when the target first air-fuel ratio fafsb is corrected to the richer side greatly based on the output rsox of the third exhaust sensor 26, the upstream catalyst 22 is controlled to continue to be in the rich condition. Thus, the rich gas components may be sufficiently supplied to the downstream catalyst 23 to obviate the lean condition of the downstream catalyst 23 and reduce the emission of lean exhaust components such as NOx.

The above embodiment may be modified in many ways. For instance, more than three catalysts may be provided in the exhaust passage and grouped into two catalyst sections, which correspond to the upstream and the downstream catalysts 22 and 23. All of or one of the three-way catalysts 22 and 23 maybe replaced with a different catalyst such as a NOx catalyst.

What is claimed is:

1. An air-fuel ratio control system for an internal combustion engine having an exhaust passage, the system comprising:
    an upstream catalyst provided in the exhaust passage;
    a downstream catalyst provided downstream the upstream catalyst in the exhaust passage;
    a first exhaust sensor provided upstream the upstream catalyst in the exhaust passage for detecting a first air-fuel ratio thereat;
    a second exhaust sensor provided between the upstream catalyst and the downstream catalyst in the exhaust passage for detecting a second air-fuel ratio thereat;
    a third exhaust sensor provided downstream the downstream catalyst in the exhaust passage for detecting a third air-fuel ratio therat; and
    a target control means for determining a target second air-fuel ratio to be attained between the upstream catalyst and the downstream catalyst based on the third air-fuel ratio detected by the third exhaust sensor, and for determining a target first air-fuel ratio to be attained upstream the upstream catalyst based on the target second air-fuel ratio and the second air-fuel ratio detected by the second air-fuel ratio sensor;
    a feedback control means for feedback controlling an air-fuel ratio of mixture based on the target first air-fuel ratio and the first air-fuel ratio detected by the first exhaust sensor; and
    correcting means for correcting the target first air-fuel ratio based on the third air-fuel ratio detected by the third exhaust sensor,
    wherein the target control means controls a change in the target first air-fuel ratio to be smaller in a predetermined range than that in a range other than the predetermined range based on the third air-fuel ratio detected by the third exhaust; and
    wherein the target control means gradually increases the change in the target first air-fuel ratio as the third air-fuel ratio becomes leaner.

2. The air-fuel ratio control system as in claim 1, wherein the target control means decreases a control gain for controlling the target first air-fuel ratio as the third air-fuel ratio detected by the third exhaust sensor becomes lean.

3. The air-fuel ratio control system as in claim 2, wherein the target control means decreases the control gain only in the predetermined range.

4. An air-fuel ratio control method for an internal combustion engine having an upstream catalyst provided in an exhaust passage, a downstream catalyst provided downstream the upstream catalyst in the exhaust passage, a first exhaust sensor provided upstream the upstream catalyst in the exhaust passage for detecting a first air-fuel ratio thereat, a second exhaust sensor provided between the upstream catalyst and the downstream catalyst in the exhaust passage for detecting a second air-fuel ratio thereat, and a third exhaust sensor provided downstream the downstream catalyst in the exhaust passage for detecting a third air-fuel ratio thereat, the method comprising:
    determining a target second air-fuel ratio to be attained between the upstream catalyst and the downstream catalyst based on the third air-fuel ratio detected by the third exhaust sensor;
    determining a target first air-fuel ratio to be attained upstream the upstream catalyst based on the target second air-fuel ratio and the second air-fuel ratio detected by the second air-fuel ratio sensor; and
    feedback controlling an air-fuel ratio of mixture based on the target first air-fuel ratio and the first air-fuel ratio detected by the first exhaust sensor,
    wherein the step of determining the target first air-fuel ratio changes the target first air-fuel ratio based on the third air-fuel ratio detected by the third exhaust sensor at a change rate slower in a predetermined range than in other range.

5. The air-fuel ratio control method as in claim 4, wherein the predetermined range is determined to be an air-fuel ratio leaner than a stoichiometric ratio in the third air-fuel ratio detected by the third exhaust sensor.

6. The air-fuel ratio control method as in claim 5, wherein the change rate is decreased as the third air-fuel ratio detected by the third exhaust sensor becomes leaner in the predetermined range.

7. The air-fuel ratio control method as in claim 5, wherein the target second air-fuel ratio is decreased to a lean side in another predetermined range of the third air-fuel ratio which is closer to the stoichiometric ratio than the predetermined range in which the target first air-fuel ratio is changed.

* * * * *